United States Patent
Rune et al.

(10) Patent No.: US 8,467,300 B2
(45) Date of Patent: Jun. 18, 2013

(54) METHODS AND ARRANGEMENTS IN A MOBILE TELECOMMUNICATIONS NETWORK

(75) Inventors: Johan Rune, Lidingo (SE); Tomas Goldbeck-Lowe, Saltsjo-Boo (SE); Tony Larsson, Upplands Vasby (SE); Mattias Pettersson, Lund (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 174 days.

(21) Appl. No.: 12/738,382

(22) PCT Filed: Oct. 18, 2007

(86) PCT No.: PCT/EP2007/061131
§ 371 (c)(1),
(2), (4) Date: Apr. 16, 2010

(87) PCT Pub. No.: WO2009/049678
PCT Pub. Date: Apr. 23, 2009

(65) Prior Publication Data
US 2010/0214955 A1 Aug. 26, 2010

(51) Int. Cl.
*H04L 12/26* (2006.01)
(52) U.S. Cl.
USPC .......................................................... 370/241
(58) Field of Classification Search
None
See application file for complete search history.

(56) References Cited

U.S. PATENT DOCUMENTS

| | | | |
|---|---|---|---|
| 6,564,342 B2 * | 5/2003 | Landan | 714/48 |
| 6,735,443 B2 | 5/2004 | Chandra et al. | |
| 7,120,417 B2 | 10/2006 | Shoki et al. | |
| 7,242,960 B2 * | 7/2007 | van Rooyen | 455/552.1 |
| 7,450,900 B2 * | 11/2008 | van Rooyen | 455/3.06 |
| 8,185,494 B2 * | 5/2012 | Davis et al. | 707/610 |
| 2003/0163558 A1 | 8/2003 | Cao et al. | |
| 2005/0147049 A1 * | 7/2005 | Ganesan | 370/241 |
| 2006/0128424 A1 * | 6/2006 | Rooyen | 455/552.1 |
| 2007/0242688 A1 * | 10/2007 | McFarland | 370/445 |
| 2009/0179989 A1 * | 7/2009 | Bessone et al. | 348/192 |

FOREIGN PATENT DOCUMENTS

| | | |
|---|---|---|
| JP | 2003324470 A | 11/2003 |
| JP | 2004201012 A | 7/2004 |
| JP | 2005531982 A | 10/2005 |
| JP | 2006060295 A | 3/2006 |
| WO | 2006/133720 A1 | 12/2006 |

OTHER PUBLICATIONS

Lin, Yow-Jian, Chan, Mun Choon, "A scalable monitoring approach based on aggregation and refinement," May 2002, IEEE Journal on Selected Areas in Communications, vol. 20, Issue 4, pp. 677-690.*

(Continued)

*Primary Examiner* — Dang Ton
*Assistant Examiner* — Ronald H Davis
(74) *Attorney, Agent, or Firm* — Coats & Bennett, P.L.L.C.

(57) ABSTRACT

The basic concept of the present invention is to utilize the terminal as an auxiliary information collector in networks where the regular network-based information collection is not possible and/or for providing information that complements the information that the network-based Access Awareness Entity collects by itself. The terminal collects information related to the access network directly, through retrieval of explicitly available information, and indirectly, through measurements and statistics. The collected information is delivered to the network-based Access Awareness Entity.

16 Claims, 6 Drawing Sheets

OTHER PUBLICATIONS

3rd Generation Partnership Project. 3GPP TS 22.240, V6.1.0 (Sep. 2003). 3rd Generation Partnership Project; Technical Specification Group Services and System Aspects; Service requirement for the 3GPP Generic user Profile (GUP); Stage 1 (Release 6).

3rd Generation Partnership Project. 3GPP TS 23.240, V6.1.0 (Sep. 2003). 3rd Generation Partnership Project; Technical Specification Group Services and System Aspects; 3GPP Generic User Profile—architecture; Stage 2 (Release 6).

* cited by examiner

METHODS AND ARRANGEMENTS IN A MOBILE TELECOMMUNICATIONS NETWORK

TECHNICAL FIELD

The present invention relates to methods and arrangements in a mobile telecommunications network. In particular, the invention relates to a solution for collecting information relating to an access network.

BACKGROUND

The present invention is related to mobile telecommunications networks and to multi-access technology. Mobile telecommunications networks are based on different access technologies such as GSM, 3G, WLAN etc. The telecommunications networks that are available to a mobile terminal must be based on an access technology that is supported by the terminal. A mobile terminal may have a plurality of available networks to connect to, wherein the available networks may be based on different access technologies. The use of the different access technologies results in that different services may be provided by the networks to the terminal. Therefore it is desired to have a network based access awareness functionality such that the network can handle management of different services over different access technologies as well as selection of access network for different services. One of the basic components of such Access Awareness functionality is gathering of relevant information about the currently concerned mobile terminal and the available access networks. When the collected information is refined and analyzed, it forms the basis for choices and decisions regarding access selection and potential adaptation of services. It should also be noted that in the context of Access Awareness this information is sometimes referred to as "attributes" and the gathering of the information is then consequently labeled attribute collection.

The problem with the existing solutions is that for some access networks the regular information collection, i.e. the information collection performed by the Access Awareness Entity in the network, cannot be performed. This includes access networks with lack of support for dissemination of such information, especially to access network external entities (i.e. entities, such as an Access Awareness Entity (AE), outside the access network, especially those located in another administrative domain), e.g. because there is no AE associated with the domain or because there is no means for network external entities to locate the relevant information sources in the concerned network. It also includes visited access networks, i.e. where the concerned user is roaming, for which the technical means are in place, but information collection is prohibited anyway, because the policies of the access network operator prohibit that some or all of the relevant information is delivered to an entity under another operator's control (unless the other operator has a special agreement with the access network operator).

In the former case the problem is technical, whereas the nature of the problem in the latter case is administrational, political or business strategic.

SUMMARY

Thus, an object of the present invention is to achieve a solution for collecting information when the collection can not be performed by the Access Awareness Entity.

According to a first aspect of the present invention an information collector in a mobile terminal is provided. The collector is adapted to collect information associated with an access network that is available to the mobile terminal. This information may by retrieved e.g. through measurements and statistics but may also constitute properties of the mobile terminal. Further, the collector comprises means for communicating the collected information or a subset of the collected information to a network based Access Awareness Entity that is capable of using the collected information to select access network and/or to adapt services provided by the network to the current conditions of the mobile terminal or another mobile terminal in terms of access network capabilities and terminal capabilities. Preferably, the information collector is adapted to receive an order from the access Awareness Entity to collect the information associated with the access network(s).

According to a second aspect of the present invention a mobile telecommunication network based Access Awareness Entity (AAE) is provided. The AAE is capable of using information associated with an access network that is available to a mobile terminal such that the AAE can select access network and/or adapt services provided by the network to the current conditions of the mobile terminal in terms of access network capabilities and terminal capabilities. The AAE comprises means for detecting that collection and transfer to the AAE of said information is not being supported by an access network to which the mobile terminal is connected, or has been connected, and means for receiving said information from the mobile terminal. Said information is preferably collected by the mobile terminal, wherein the collection may be initiated by an order from the AAE.

According to a third aspect a method for collecting information in a mobile terminal is provided. The collected information is associated with the access network or networks that are available to the mobile terminal. The method comprises the steps of:
  collecting information associated with the access network(s), and
  communicating the collected information or a subset of the collected information to a network based Access Awareness Entity that is capable of using the collected information to select access network and/or to adapt services provided by the network to the current conditions of the mobile terminal or another mobile terminal in terms of access network capabilities and terminal capabilities.

According to a fourth aspect of the present invention a method in a mobile telecommunication network based access Awareness Entity (AAE) is provided. The AAE is capable of using information associated with an access network that is available to a mobile terminal such that the AAE can select access network and/or adapt services provided by the network to the current conditions of the mobile terminal in terms of access network capabilities and terminal capabilities. The method comprises the steps of:
  detecting that collection and transfer to the AAE of said information is not being supported by an access network to which the mobile terminal is connected, or has been connected, and
  receiving said information from the mobile terminal.
  Some advantages of the invention are:
  It enables information retrieval from access networks where the Access Awareness Entity is prohibited from direct information collection (using regular means) due to lack of technical support or policy related (administrational, political, business strategic) obstacles.

A wide range of possible granularity for the scope of the collected information, including e.g. statistics per access network type, per access network (defined by e.g. IP subnet, SSID/ESSID or combination of access network type and operator) and per individual access point.

The collected information can be refined over time, including accumulation of data over several distinct periods of access.

Information retrieved by the terminal can complement directly (through regular means) retrieved information with types of data and measurements that are not available through regular information retrieval means (even though information retrieval in general is not prohibited).

The Access Awareness Entity can combine information retrieved by the terminal with information retrieved through regular means to achieve greater accuracy in the data.

The Access Awareness Entity can combine information retrieved by different terminals to achieve greater accuracy and refined information quality.

DETAILED DESCRIPTION

Figure 1:
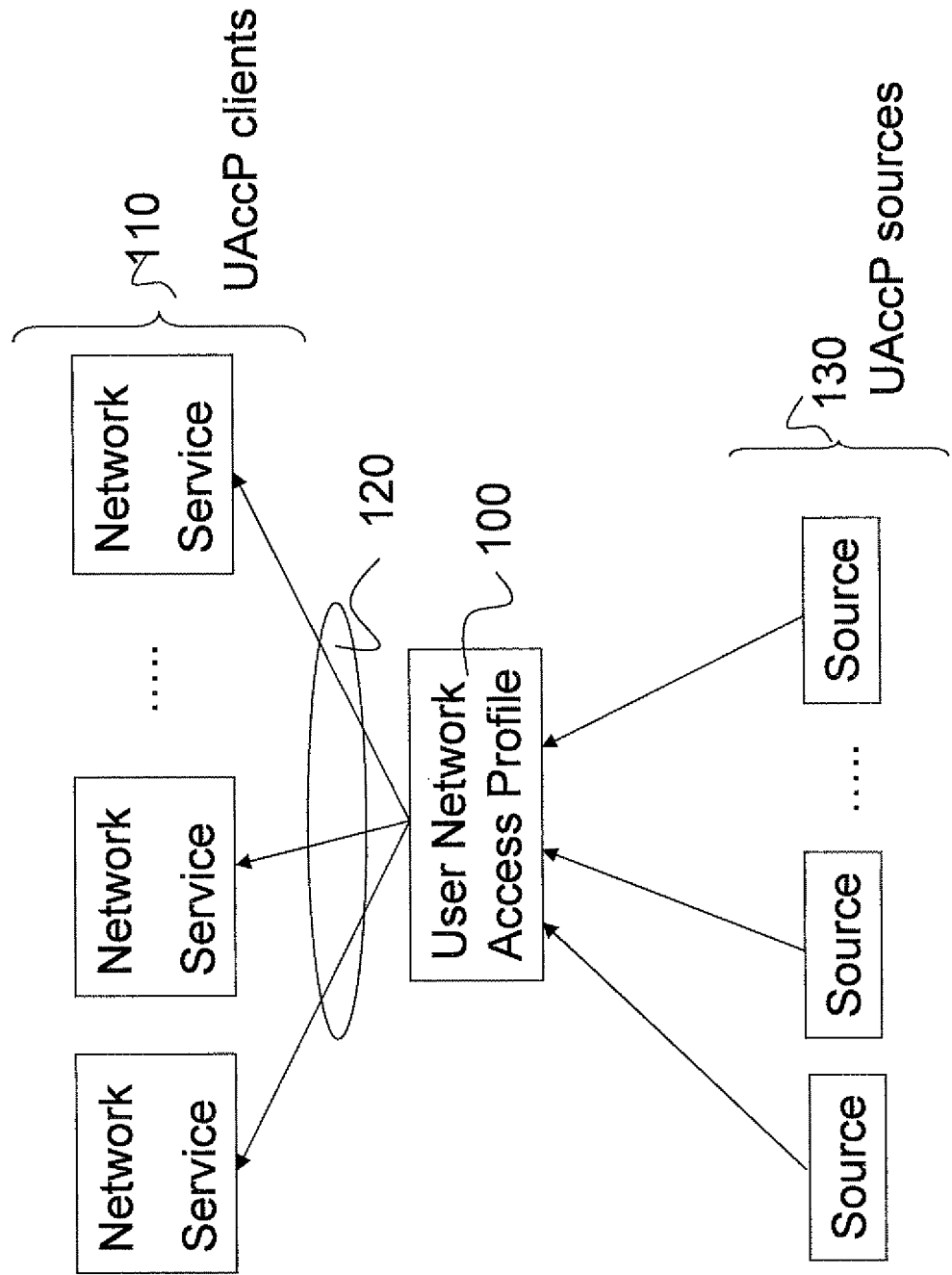
FIG. 1 is schematic illustration of an access awareness function between the network elements and the application and services denoted User Network Access Profile Service (UAccP) wherein the present invention may be implemented.

The present invention will be described more fully hereinafter with reference to the accompanying drawings, in which preferred embodiments of the invention are shown.

The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

As stated above, the present invention relates to a network based access awareness functionality. Examples of implementations of such network based access awareness functionality are described below.

It is suggested to improve the possibilities for third party services as well as systems inside the operator domain to become aware of the access related conditions of a certain user. To achieve this it is proposed to insert an access awareness function between the network elements and the application and services to collect, filter, abstract, and communicate user network access related information. This function is denoted User Network Access Profile Service (UAccP).

FIG. 1 provides an abstract high-level view of the UAccP architecture.

If working as expected UAccP 100 will make it possible for various service providers 110 to, via a common API 120, get information about the user's current access conditions (e.g. access technology, bandwidth, QoS, delay). It allows services to become access aware, which enables service providers to adapt the service/content and thus provide a better end-user experience.

The goal of UAccP is to create an extendable architecture for access related attribute exchange that wraps existing legacy systems that do not support explicit attribute exchange. The UAccP should provide static information (e.g., terminal capabilities, operator specific configurations, current subscriptions), semi-static information (e.g. current coverage/networks in range: 3G, WLAN, current user preferences) and dynamic information (current access sessions, available bearers etc.) to application developers in a suitable way and hide implementation details (e.g., where the information comes from, which standard was used), to allow a subscribe/notify mechanism for complex events.

The common API 120 and the central (single-source) provision of user/access related information for services are key features of UAccP. It collects information from a variety of sources 130 using heterogeneous source-dependent protocols such as AAA protocols (e.g. Diameter described in "Diameter Base protocol" (RFC 3588) or RADIUS described in "Remote Authentication Dial in user service (RADIUS)", RFC 2865 or O&M protocols (such as SNMP described in "An architecture for describing Simple Network Management Protocol (SNMP) management frameworks", RFC 3411), but, in contrast, presents a single source of information through a single API towards applications.

Figure 2:
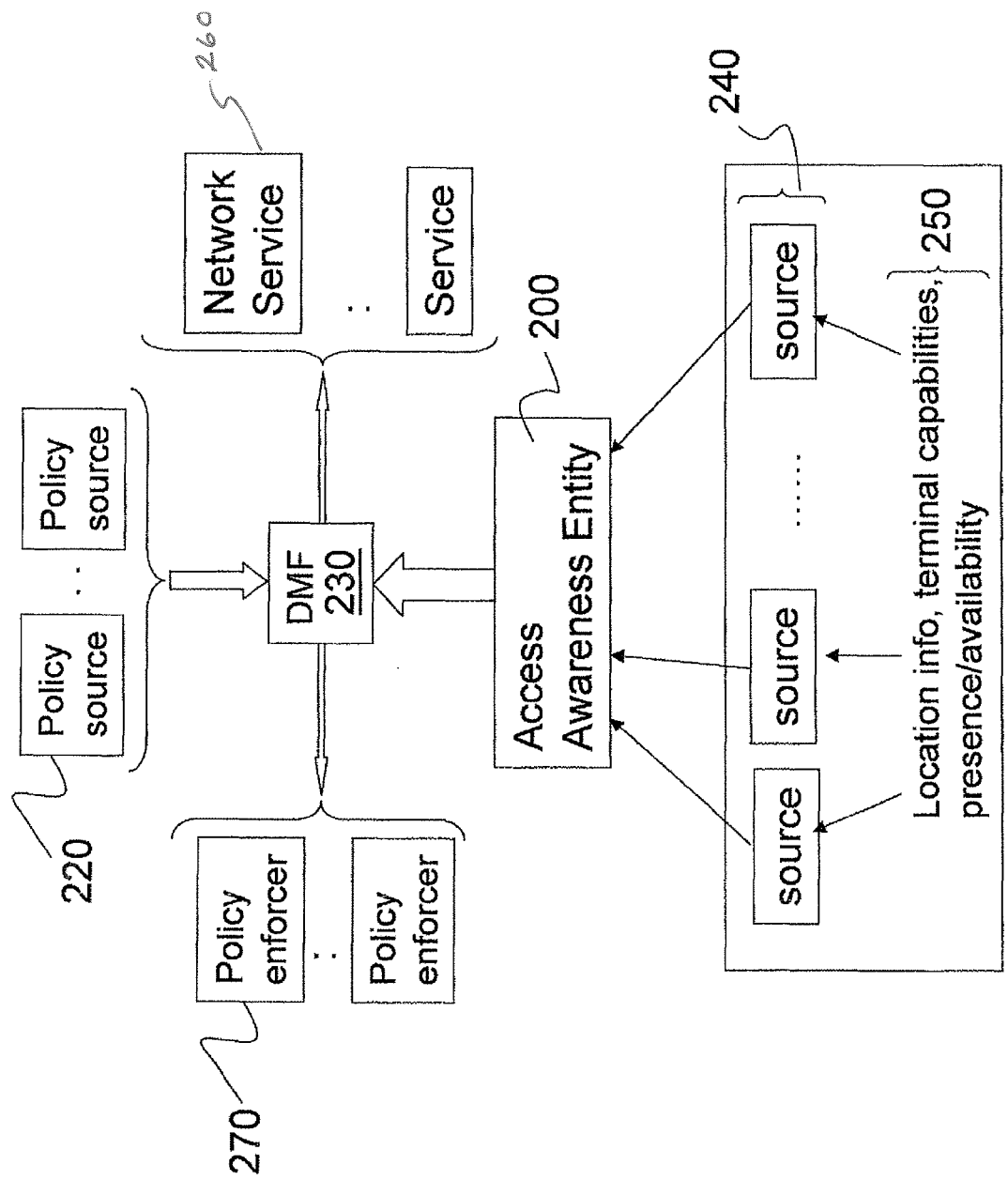
FIG. 2 is a schematic illustration of an Access Awareness Entity wherein the present invention may be implemented.

Turning now to FIG. 2 showing another approach building to a certain extent on the UAccP concept. It uses a corresponding entity, labeled Awareness Entity (AE) 200, to gather information 250 from sources 240, which information is fed into a policy machinery, whose central entity is a policy server and decision engine 230 denoted Decision Making Function (DMF). The result of the DMF is forwarded to network services and services 260, such that the services can adapt to the current situation, and/or to policy enforcers 270 which ensure that services and data flows comply with existing policies and DMF results. It is assumed that each administrative domain has its own AE and that both an AE in the home domain (AEh) and an AE in the visited domain (AEv) can be involved when information is gathered. In such case the DMF, which is always located in the home domain, communicates only with the AEh, which in turn contacts the AEv if needed.

For the UAccP concept, the access awareness is about adapting services to the current conditions of a targeted user, in terms of access and terminal capabilities. The proposed mechanisms of the Awareness Entity of FIG. 2 expands this Access Awareness concept by adding the notion of selecting for a multi-access terminal the most appropriate access for a certain service.

In the current 3GPP architecture there is a concept similar to the UAccP/AE denoted Generic User Profile (GUP) Server described in 3GPP TS 22. 240 V6.5.0, "3rd Generation Partnership Project; Technical Specification Group Services and System Aspects; 3GPP Service Requirements for the Generic User Profile (GUP); Stage 1 (Release 6)", January 2005, 3GPP TS 23.240 V6.7.0, "3rd Generation Partnership Project; Technical Specification Group Services and System Aspects; 3GPP Generic User Profile (GUP); Architecture (Stage 2) (Release 6)", March 2005 and in 3GPP TS 29.240 V6.1.0, "3rd Generation Partnership Project; Technical Specification Group Core Network and Terminals; 3GPP Generic User Profile (GUP); Stage 3; Network (Release 6)", June 2005

In general, Access Awareness is expected to bring benefits to all players involved in the overall delivery of networked services: network operators, service providers, application developers as well as end-users. In summary the benefits include new service opportunities, reduced complexity, simplified service integration, simplified application development, increased service adaptability, increased service quality and improved end-user convenience.

As stated above, the problem with the existing solutions is that for some access networks the regular information collection, i.e. the information collection performed by the Access Awareness Entity in the network, cannot be performed. This includes access networks with lack of support for dissemination of such information, especially to access network external entities (i.e. entities, such as an Access Awareness Entity, outside the access network, especially those located in another administrative domain), e.g. because there is no AE associated with the domain or because there is no means for network external entities to locate the relevant information sources in the concerned network. It also includes visited access networks, i.e. where the concerned user is roaming, for which the technical means are in place, but information collection is prohibited anyway, because the policies of the access network operator prohibit that some or all of the relevant information is delivered to an entity under another operator's control (unless the other operator has a special agreement with the access network operator).

In the former case the problem is technical, whereas the nature of the problem in the latter case is administrational, political or business strategic. The present invention solves or mitigates the problem in both cases.

The basic concept of the invention is to utilize the terminal as an auxiliary information collector in networks where the regular attribute collection is not possible (due to either of the political or technical problem described above). An equally important reason for using the terminal as an auxiliary information collector is that it can provide an Access Awareness Entity with information that complements the information that the Access Awareness Entity collects directly and that it typically cannot collect by itself (even in cases when information collection in general is not prohibited). Although the latter reason is equally important as the former, the further description of the invention focuses on using the terminal in networks where the Access Awareness Entity is prohibited from performing its regular information collection.

Figure 3A:
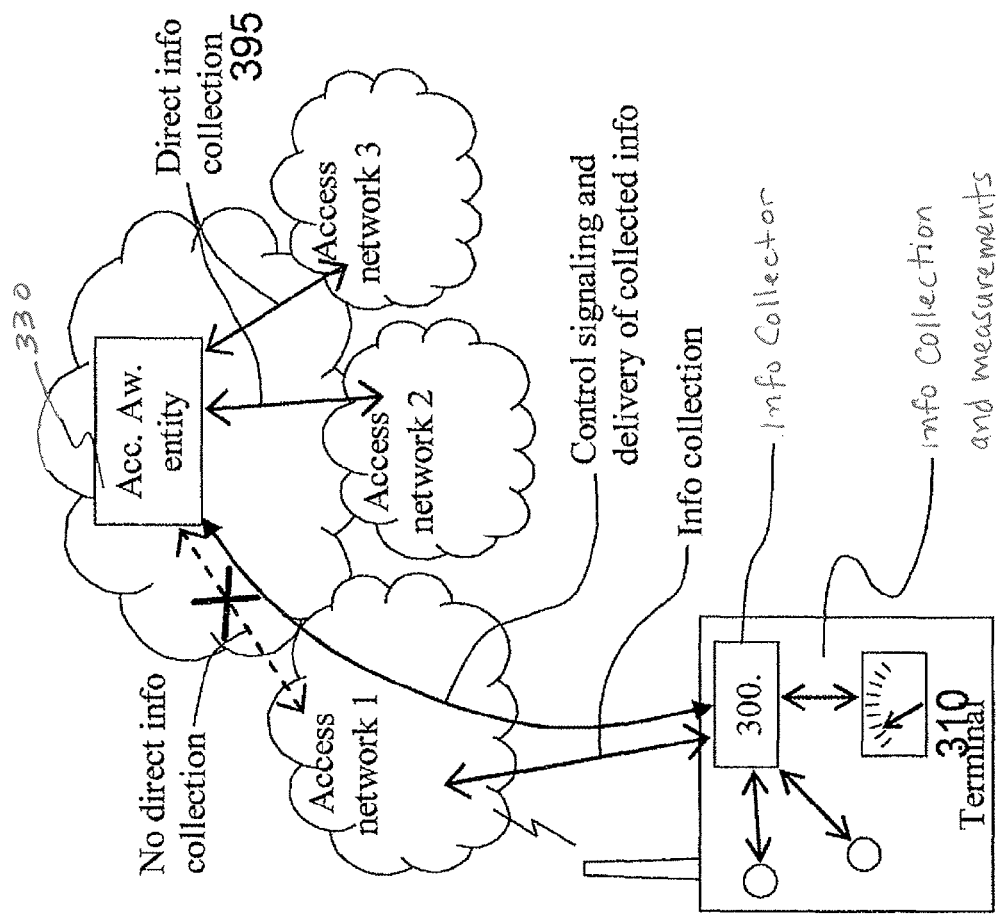
FIG. 3a illustrates schematically information flows between the terminal and the Access Awareness Entity according to an embodiment of the present invention.
Figure 3B:
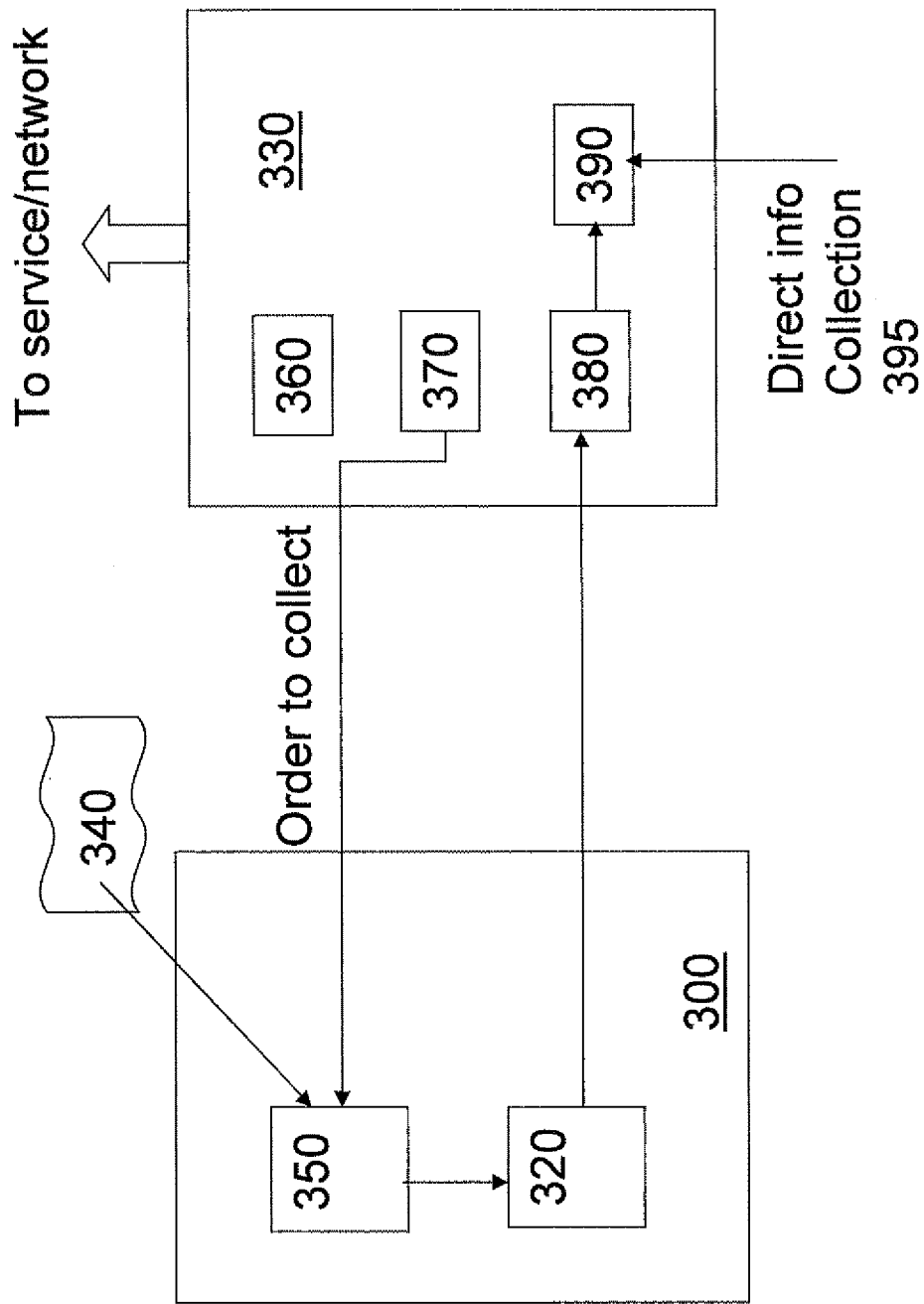
FIG. 3b illustrates schematically the terminal and the Access Awareness Entity according to an embodiment of the present invention.

The terminal collects information related to the access network directly, through retrieval of explicitly available information, and indirectly, through measurements and statistics. The collected information is delivered to the network-based Access Awareness Entity. The information related to the access network may be of various types. Some examples include access network type, available bandwidth, available quality of service (QoS), current traffic load, presence of a Network Address Translator (NAT), NAT traversal mechanisms in place (e.g. an Application Level Gateway (ALG) or a Simple Traversal Underneath NAT (STUN) server), service/policy restrictions (e.g. forbidden video codecs), firewall information, etc. The solution is schematically illustrated in FIG. 3a and the information collector and the Access Awareness Entity is further illustrated in FIG. 3b.

In accordance with an embodiment of the invention an Access Awareness Entity and a terminal is described below.

An information collector 300 for a mobile terminal 310 is provided. The collector is adapted to collect information 340 associated with the access network or networks that are available to the mobile terminal. The collector comprises means for communicating 320 the collected information 340 or a subset thereof to a network based Access Awareness Entity 330 that is capable of using the collected information 340 to select access network and/or to adapt services provided by the network to the current conditions of the mobile terminal 310 or another mobile terminal in terms of access and terminal capabilities, e.g. the terminal's bandwidth support or display size. The information collector 300 may comprise means for starting 350 the collection upon receipt of an order from the Access Awareness Entity or means for collecting 350 information continuously. In accordance with one embodiment, the collector comprises means for communicating 320 the collected information to the Access Awareness Entity 330 when the information 340 is changed.

Moreover, a mobile telecommunication network based Access Awareness Entity 330 is provided. The Access Awareness Entity 330 is capable of using information associated with access network or networks that is/are available to a mobile terminal such that that the Access Awareness Entity can select access network and/or adapt services provided by the network to the current conditions of the mobile terminal in terms of access and terminal capabilities. The Access Awareness Entity 330 comprises means for detecting 360 that collection and transfer to the Access Awareness Entity of said information is not being supported by an access network to which the mobile terminal is connected, or has been connected, (for technical or administrational reasons), and means for receiving 380 the collected information and other information such as information collection capabilities of the mobile terminal from the mobile terminal. Further, the Access Awareness Entity comprises preferably means for ordering 370 the mobile terminal to collect information related to access network(s). Means 390 may also be provided for combining the information 340 received from and collected by the mobile terminal 310 with information 395 collected by the Access Awareness Entity. In addition the Access Awareness Entity may also comprise means for adapting the ordering of the mobile terminal to collect information in accordance with the received information collection capabilities of the mobile terminal.

It should be noted that "Access Awareness Entity" may refer to an entity whose functionality is equivalent to that of a UAccP/AE or a DMF or a combination thereof.

The embodiments of the present invention will be described further below.

Detection of Lack of Support for Regular Information Collection:

The Access Awareness Entity determines that information collection in the terminal should be leveraged, when it detects that an access network to which the terminal is connected (or has been connected) and which the Access Awareness Entity needs information from does not support regular network-based information collection.

The Access Awareness Entity may locate information sources (original sources or another Access Awareness Entity) either through configuration data or through a dynamic discovery mechanism. The dynamic discovery mechanism would typically be a DNS (Domain Name System) service request. With a DNS service request the Access Awareness Entity requests the DNS system to return an FQDN (Fully Qualified Domain Name) of an Access Awareness Entity, which FQDN in turn can be resolved into an IP (Internet Protocol) address. The final IP address can be returned in the DNS response together with the FQDN or as a result of another DNS request. The service request should have the QNAME (query name) parameter set to the domain name of the domain of the sought Access Awareness Entity, prepended by a predefined prefix. The QTYPE (query type) parameter of the service request should be set to "SRV" to indicate that a service resource record is requested.

As an example, if the Access Awareness Entity needs to find another Access Awareness Entity in the domain "other-domain.com", then the QNAME of its service request could be e.g. "_aae.other-domain.com", assuming that the above-mentioned predefined prefix for indicating that an Access Awareness Entity is sought is "_aae".

If the Access Awareness Entity relies on configured information source location data, then the lack of configuration data for a certain access network is the trivial indication of lack of support for regular information collection from this access network.

If the Access Awareness Entity uses dynamic location of information sources, or a combination of configuration-based and dynamic location (e.g. falling back to dynamic location in the absence of configured location data), then lack of support for regular information collection from an access network is indicated by an unsuccessful DNS service request.

It is also beneficial for the Access Awareness Entity to detect what information collection capabilities the terminal has, i.e. what kind of information it can provide to the Access Awareness Entity. Especially if the Access Awareness Entity uses the information retrieved by the terminal as a complement to, rather than a substitute for, its directly collected information as described below. This is preferably done through direct communication with the terminal.

Communication between the Access Awareness Entity and the Terminal:

Obviously the Access Awareness Entity and the terminal have to communicate in order to make use of the present invention. The Access Awareness Entity may trigger the terminal to initiate information collection and/or to transfer collected information to the Access Awareness Entity. These triggers may however be optional, as explained below. In any case the terminal at some point in time has to transfer collected information to the Access Awareness Entity. Furthermore, it is also useful for the Access Awareness Entity to be able to find out what kind of information it can retrieve from the terminal, i.e. what information collection capabilities the terminal has and what kind of information that is available to the terminal in the current situation.

The Access Awareness Entity may trigger the terminal to initiate information collection, when the Access Awareness Entity detects lack of support for regular information collection in an access network to which the terminal is currently connected. Initiating information collection at this point may however infer an undesirable delay that could be avoided. If the terminal instead continuously collects information, the information will always be available when the Access Awareness Entity needs it. An advantage of the triggering alternative is that the Access Awareness Entity may specify exactly what kind of information it wants the terminal to collect. This specification, as well as the explicit triggering, limits the terminal's engagement in information collection to what is absolutely necessary. An advantage of the continuous collection alternative is that any information that the Access Awareness Entity needs (and that the terminal is capable of collecting) is readily available without the delay associated with the actual collection of the information. Moreover, if the terminal frequently collects and sends information to the Access Awareness Entity, it is likely that greater accuracy can be achieved in the information. A disadvantage of the continuous collection alternative is that the terminal will always be engaged in information collection, even when this is not needed, thereby unnecessarily consuming capacity in itself and possibly in the network.

A compromise, that may be the most attractive method, is that the Access Awareness Entity triggers initiation of information collection in the terminal the first time it sees a need for it, either because it detects lack of support for regular information collection in a certain access network or because it realizes that the terminal can provide useful information that the Access Awareness Entity cannot retrieve by itself (even if the access network does support information collection in general). Subsequently the terminal remembers that it should continuously collect information when connected to this particular access network (or in this particular type of access network or even in all access networks depending on the kind of instructions received from the Access Awareness Entity).

The Access Awareness Entity may also trigger, i.e. request, transfer of collected information from the terminal. If the Access Awareness Entity, as described in the first alternative above, triggers collection of specific information when needed, then this trigger is also implicitly a request to the terminal to send the concerned information to the Access Awareness Entity once it has been collected.

If the terminal continuously collects information, as in the second and (to a somewhat restricted extent) third alternatives above, the Access Awareness Entity should preferably explicitly request specific collected information to be transferred when needed.

It is also possible to use a more advanced mechanism for information transfer request. The Access Awareness Entity could treat the terminal more or less as another information source (or replacement of a peer Access Awareness Entity) and specify not only what kind of information it wants, but also under what conditions it wants it. This translates into subscribing to events, i.e. requesting to be notified of specific events, according to certain in the request specified conditions, such as availability of a certain bandwidth or that a measured value exceeds a certain threshold value. If the type of information being collected is not too dynamic, it is also possible to simply let the terminal transfer the information to the Access Awareness Entity whenever the information changes. Having the terminal periodically transfer and update collected information without paying any attention to specific conditions is also a simple possibility.

The terminal and the Access Awareness Entity may also communicate to inform the Access Awareness Entity of what kind of information the terminal is able to supply. This consists of two parts: the inherent information collection capabilities in the terminal and the kind of information that is available to the terminal in the current situation. The terminal preferably supplies this information on request from the Access Awareness Entity. The Access Awareness Entity may also request to be updated if/when the information changes (e.g. due to situation changes, e.g. movements to new access networks, or changes in the terminal's capabilities).

For the simple trigger and request messages it is probably preferable to use a new UDP-based or TCP-based application-level protocol or to reuse a rather generic information transfer protocol like FTP or HTTP. For the more advanced requests it may be better to reuse a protocol that already includes a mechanism for subscription and event notification. One such protocol is SIP described in J. Rosenberg et al., "SIP: Session Initiation Protocol", RFC 3261, June 2002, which includes the Subscribe/Notify methods as described in A. B. Roach, "Session Initiation Protocol (SIP)-Specific Event Notification", RFC 3265, June 2002 and an event package framework. A variant or package of SIP developed by the Open Mobile Alliance (OMA) (denoted OMA SIP Push) may also be used or the OMA Device Management mechanisms. Regardless of which protocol that is used, the communication between the terminal and the Access Awareness Entity should preferably be protected in terms of both encryption and message authentication, e.g. using IPsec (IP security), TLS (transport Layer Security), or S-HTTP (Secure HyperText Transfer Protocol).

Terminal-based Collection of Information from an Access Network:

In the following it is described which information about the access network that can be retrieved by the terminal and how it can be retrieved. The information can range from indications of technology types and general properties to current state of dynamic conditions. The available means for information retrieval can be categorized as explicit information and measurements and the information can be retrieved from either the access network or the terminal itself.

The most easily retrieved information is the type of interface used in the terminal itself. This simple piece of information allows important conclusions to be drawn about the properties of the access network and the current access link, such as reasonable bandwidth expectations, availability of QoS classes or only best effort, implications of expectable error rates, roundtrip delays for access network retransmissions, etc. This explicit and derived information, as well as the type of interface/access technology itself can be very useful information for the Access Awareness Entity.

Broadcast information from an access point, e.g. WLAN beacon messages, can provide similar information and may allow more accurate conclusions of the same kind.

The terminal can also check whether it has a QoS profile configured for the concerned type of access network or the concerned particular access network, e.g. matched with an IEEE 802.11 SSID (Service Set Identifier) or ESSID (Extended Service Set Identifier). Such a QoS (Quality of Service) profile could provide quite explicit information about what QoS that can be expected. An IEEE 802.11 SSID and/or ESSID may also themselves be useful information to transfer to the Access Awareness Entity.

Yet a very useful source of information that may be available is a local network profile, which may provide explicit information that goes beyond what can be derived from the type of technology and broadcast information. This additional information may include e.g. policies (e.g. lists of acceptable or not acceptable codecs), firewall information, presence of NATs (Network Address Translation), NAT traversal mechanisms such as ALGs or a STUN (Simple Traversal Underneath NAT) server, HTTP (Hyper Text Transfer Protocol) proxies, etc. The terminal may retrieve a local network profile using the mechanisms described in D. Petrie et al., "A framework for session initiation protocol user agent profile delivery", Internet-Draft draft-ietf-sipping-config-framework-10, Sep. 2007.

Another way for the terminal to collect useful information is through various measurements and by accumulating statistics.

By monitoring the traffic passing through its interfaces the terminal gets indications of the bit rate and QoS it receives from the access network. By accumulating and integrating the measurements over time the terminal can achieve gradually refined and increasingly accurate statistical values, such as mean values and standard deviations. Such medium and long term statistics can be stored in the terminal in between access sessions, so that the data can be further refined during each period that the terminal is connected to a certain access network (or a certain type of access network). The access network "granularity" for such statistics may be coarse, e.g. statistics collected per access network type, medium, e.g. statistics per access network (defined by e.g. IP subnet, SSID/ESSID or combination of access network type and operator) or fine, e.g. statistics per individual access point. Yet an option is to let the Access Awareness Entity combine the statistics from different access sessions, instead of the terminal. An advantage of this may be that statistics can be accumulated per user, even if the user switches between different terminals. Another benefit is that the terminal is offloaded of the permanent storage of statistics data.

The terminal can also use active measurement techniques to acquire data on the characteristics of the access network and the received bit rate and QoS. Such active measurement mechanisms include e.g. exchanging Internet Control Message Protocol (ICMP) echo requests/responses with a node in the network (cf. the "ping" application) to measure roundtrip delays, tracking routes and/or discovering per hop delays by transmitting void UDP (User Datagram protocol) packets to a node in the network with increasingly higher time-to-live values in the IP header (cf. the "traceroute" application) and the currently available (or similar) programs for measuring received bitrates on broadband connections, e.g. TPTEST.

How the Access Awareness Entity Uses the Information Collected by the Terminal:

The Access Awareness Entity uses the information received from the terminal instead of or as a complement to regularly (directly) collected information from the concerned access network. This data may however be of a different nature than the type of data that the Access Awareness Entity regularly collects itself. It may require processing and/or it might be possible to enhance it before it is fed into the regular processes of the Access Awareness Entity.

As mentioned above, the Access Awareness Entity may accumulate and refine statistics collected by a terminal during several separate periods of connection to an access network (or type of access network or access point etc.). But being in a central position the Access Awareness Entity can do more than that. It can combine (or compare) data received from several different terminals regarding measurements of the same quantity in the same access network (or type of access network or access point etc.) and thereby further enhance the statistics and increase its accuracy. This combined and enhanced information/statistics can be used as input data to access selection and/or service adaptation for several terminals, even terminals that have not contributed to the collection of the information/statistics.

It will often be desirable to have comparable data from different access networks, so that relevant conclusions can be drawn from comparing data from different access networks. This means for instance that the data from the different access networks represent equivalent quantities or properties and if generated through measurements, that equivalent measurement methods have been used in the different access networks. When data collected by a terminal is involved, this will not always be the case. Data generated by measurements performed in a terminal may be compared with data directly retrieved by the Access Awareness Entity (through regular means) or with data generated using different measurement methods or different measurement period lengths. In such cases the Access Awareness Entity should strive to derive comparable data from the data received from a terminal. In many such cases it will also be beneficial to use statistical methods to assess the accuracy, e.g. in terms of standard deviation or statistical error interval, of the data received from the terminal.

Although a prime purpose of utilizing the terminal for information collection according to this solution is to fill the gap in cases when the Access Awareness Entity cannot perform its regular information collection, this is not the only possible way to use it. As mentioned before it may be equally useful for the Access Awareness Entity to use information collected by a terminal in parallel with data collected through regular means from the same access network. The data received from the terminal could then complement the data retrieved through regular means to further increase the accuracy e.g. by combining the different data. It could also complement the data retrieved through regular means from the same access network by providing indications of properties or measurements of quantities that could not be achieved through the regular collection means (e.g. end-to-end delay measurements) or which achieve better accuracy when produced by the terminal.

Figure 4A:
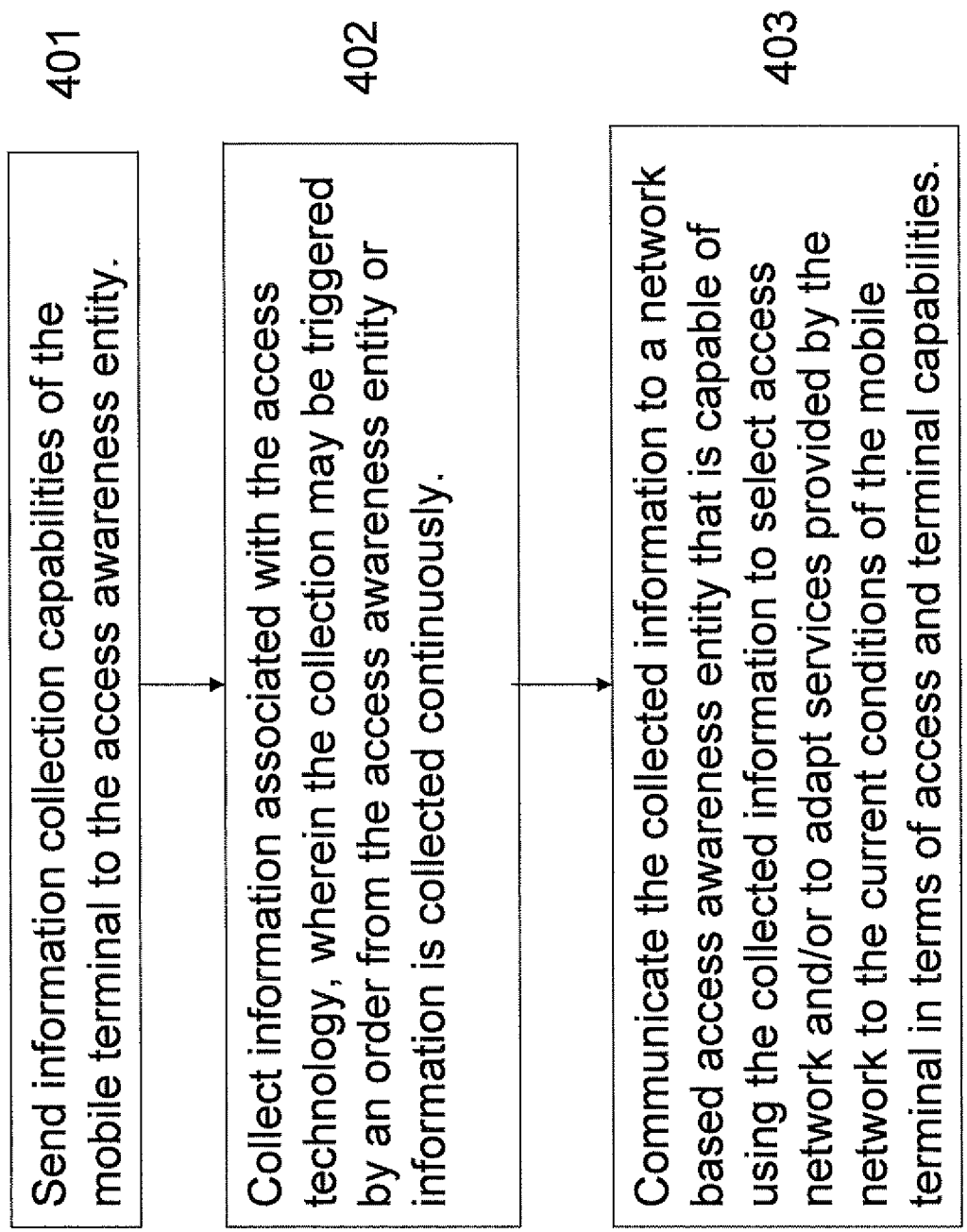
FIG. 4a and FIG. 4b are flowcharts of the methods according to embodiments of the present invention.

In accordance with further aspects of the invention, the present invention relates to methods in a mobile terminal and in an Access Awareness Entity. Turning now to FIG. 4a illustrating the steps of the method to be implemented in a mobile terminal according to one embodiment. The method comprises the steps of:

401. Send information collection capabilities of the mobile terminal to the Access Awareness Entity.

402. Collect information associated with access network(s), wherein the collection may be triggered by an order from the Access Awareness Entity or information is collected continuously.

403. Communicate the collected information to a network based Access Awareness Entity that is capable of using the collected information to select access network and/or to adapt services provided by the network to the current conditions of the mobile terminal in terms of access and terminal capabilities. The collected information may be communicated only when the information is changed.

Figure 4B:
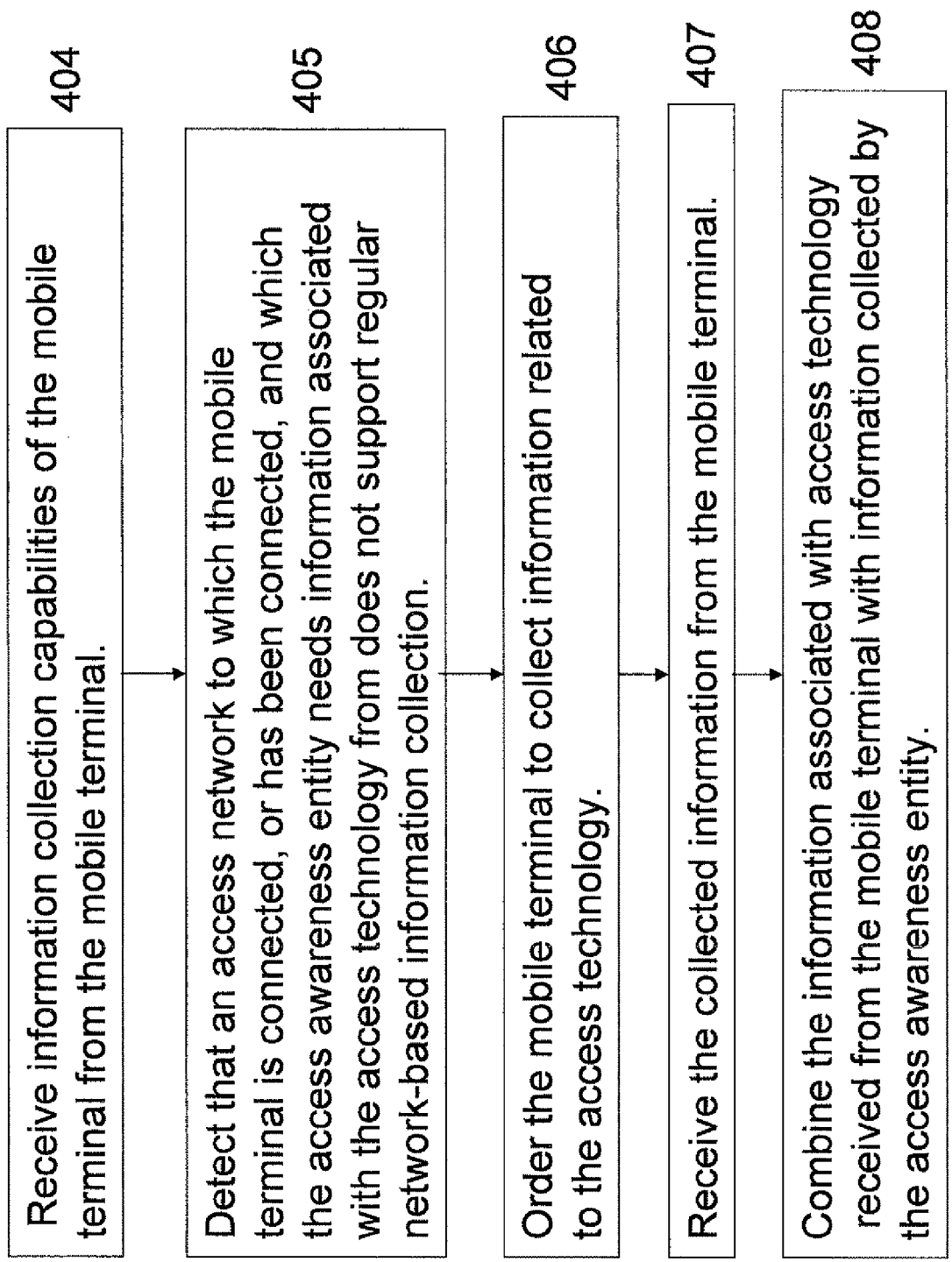

Turning now to FIG. 4b illustrating the steps of the method to be implemented in an Access Awareness Entity according to one embodiment. The method comprises the steps of:

404. Receive information collection capabilities of the mobile terminal from the mobile terminal.

405. Detect that an access network to which the mobile terminal is connected, or has been connected, and which the Access Awareness Entity needs information associated with the access network(s) from does not support regular network-based information collection.

406. Order the mobile terminal to collect information related to the access network(s).

407. Receive the collected information from the mobile terminal.

408. Combine the information associated with access network(s) received from the mobile terminal with information collected by the Access Awareness Entity.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method of performing access network selection and/or network service adaptation for a mobile terminal based on current conditions of the mobile terminal, the method performed in a telecommunications network-based Access Awareness Entity (AAE) and comprising:
   detecting that an access network to which the mobile terminal is connected, or to which the mobile terminal has been connected, does not support collection and transfer of information used by the AAE in selecting an access network and/or adapting a network service to the AAE for the mobile terminal;
   triggering the mobile terminal to collect and send the information to the AAE responsive to the detection; and
   performing an access network selection and/or a network service adaptation for the mobile terminal based on the information and in accordance with the capabilities of the access network and of the mobile terminal,
   wherein detecting that an access network does not support the collection and transfer of the information to the AAE comprises:
   sending a service request to an information source in the access network to request the information; and
   detecting that the access network does not support collection and transfer of the information if the request is not successful.

2. The method of claim 1 wherein detecting that an access network does not support the collection and transfer of the information to the AAE comprises:
   determining whether the AAE can access configuration data for an information source in the access network; and
   detecting that the access network does not support the collection and transfer of the information to the AAE if the AAE cannot access the configuration data.

3. The method of claim 1 further comprising:
   determining the capabilities of the mobile terminal to collect the information; and
   determining what type of information is currently available to the mobile terminal.

4. The method of claim 1 further comprising:
   combining the information received from the mobile terminal with information collected by the AAE; and
   performing the access network selection and/or the network service adaptation for the mobile terminal based on the combined information and in accordance with the capabilities of the access network and of the mobile terminal.

5. The method of claim 1 wherein triggering the mobile terminal to collect and send the information to the AAE comprises:
   controlling the mobile terminal to collect a specified type of information; and
   identifying, to the mobile terminal, one or more predefined conditions to which the mobile terminal will send the specified type of information to the AAE.

6. The method of claim 1 further comprising triggering the mobile terminal to collect and send the information responsive to determining that the mobile terminal is capable of collecting and sending the information to the AAE.

7. The method of claim 1 wherein triggering the mobile terminal to collect and send the information to the AAE comprises:
   initially triggering the mobile terminal to collect and send the information to the AAE; and
   thereafter, periodically receiving the information from the mobile terminal responsive to the initial triggering.

8. The method of claim 1 further comprising:
   determining the capabilities of the mobile terminal to collect the information; and
   adapting the triggering of the mobile terminal to collect the information based on the determined capabilities of the mobile terminal.

9. An Access Awareness Entity (AAE) in a telecommunications network, the AAE configured to perform access network selection and/or network service adaptation for a mobile terminal based on current conditions of the mobile terminal, the AAE comprising:
   a communications interface configured to communicate data with a mobile terminal; and a processing circuit configured to:
  detect that an access network to which the mobile terminal is connected, or to which the mobile terminal has been connected, does not support collection and transfer of information used by the AAE in selecting an access network and/or adapting a network service to the AAE for the mobile terminal;
  trigger the mobile terminal to collect and send the information to the AAE responsive to the detection; and
  perform an access network selection and/or a network service adaptation for the mobile terminal based on the information and in accordance with the capabilities of the access network and of the mobile terminal,
  wherein the processing circuit is further configured to:
    send a service request to an information source in the access network to request the information; and
    detect that the access network does not support collection and transfer of the information if the request is not successful.

10. The AAE of claim 9 wherein the processing circuit is further configured to:
  determine whether the AAE can access configuration data for an information source in the access network; and
  detect that the access network does not support the collection and transfer of the information to the AAE if the AAE cannot access the configuration data.

11. The AAE of claim 9 wherein the processing circuit is further configured to:
  determine the capabilities of the mobile terminal to collect the information; and
  determine what type of information is currently available to the mobile terminal.

12. The AAE of claim 9 wherein the processing circuit is further configured to:
  combine the information received from the mobile terminal with information collected by the AAE; and
  perform the access network selection and/or the network service adaptation for the mobile terminal based on the combined information and in accordance with the capabilities of the access network and of the mobile terminal.

13. The AAE of claim 9 wherein the processing circuit is further configured to:
  control the mobile terminal to collect a specified type of information; and
  identify, to the mobile terminal, one or more predefined conditions to which the mobile terminal will send the specified type of information to the AAE.

14. The AAE of claim 9 wherein the processing circuit is further configured to trigger the mobile terminal to collect and send the information responsive to determining that the mobile terminal is capable of collecting and sending the information to the AAE.

15. The AAE of claim 9 wherein the processing circuit is further configured to:
  initially trigger the mobile terminal to collect and send the information to the AAE; and
  thereafter, periodically receive the information from the mobile terminal responsive to the initial triggering.

16. The AAE of claim 9 wherein the processing circuit is further configured to:
  determine the capabilities of the mobile terminal to collect the information; and
  adapt the triggering of the mobile terminal to collect the information based on the determined capabilities of the mobile terminal.

* * * * *